Oct. 20, 1964 V. J. QUIOGUE 3,153,781

ENCODER CIRCUIT

Filed Jan. 30, 1959

INVENTOR.
VIRGILIO J. QUIOGUE

BY

William E. Cleaver

AGENT

United States Patent Office 3,153,781

Patented Oct. 20, 1964

3,153,781

ENCODER CIRCUIT

Virgilio J. Quiogue, Princeton, N.J., assignor to Burroughs Corporation, Detroit, Mich., a corporation of Michigan Filed Jan. 30, 1959, Ser. No. 790,084
11 Claims. (Cl. 340—347)

Figure 2:
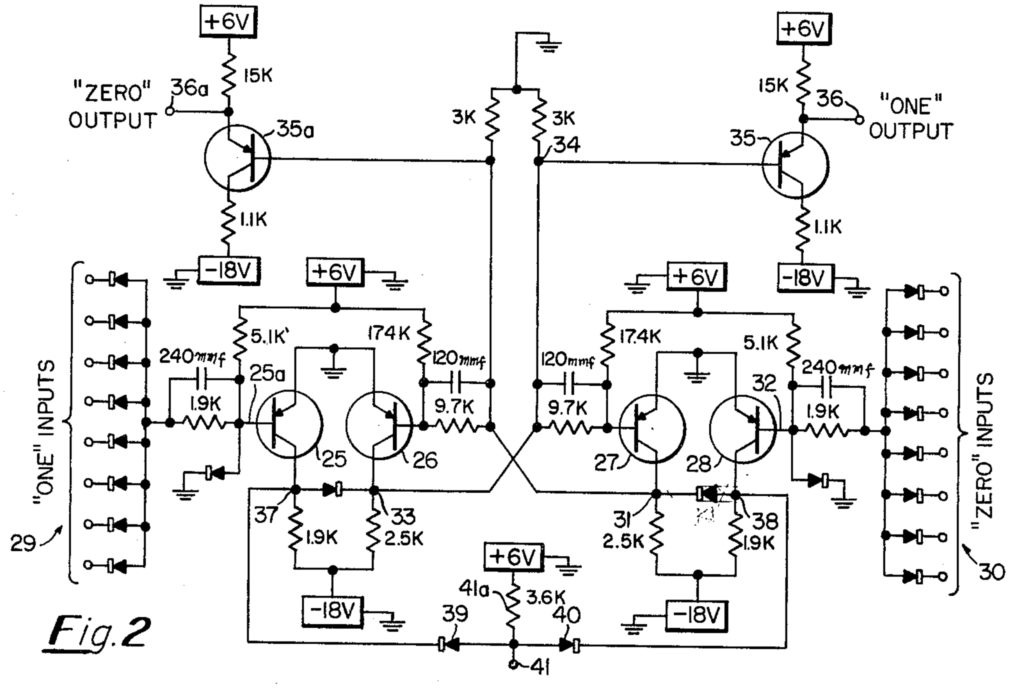

This invention relates to data processing and in particular to a circuit for encoding signals which may be present on any one of a plurality of channels.

In data processing systems it is very often necessary to convert an analog signal into a signal of binary form, wherein the binary bits may or may not be weighted to represent a decimal digit or an alphabet letter. One way of accomplishing this is to provide a plurality of filter circuits with one each assigned to each possible analog signal to be handled. Each filter network is assigned a numercial or letter value and thus a signal passed by a filter network can be automatically converted into a binary coded value of the signal.

Such a data processing arrangement is used in character recognition systems wherein each of the printed characters read generates a characteristic waveform signal. Each waveform signal generated and representing one of the particular printed characters, is passed to a plurality of filter networks. The particular filter network assigned to a printed character will pass a significant signal as compared to the other networks when its associated printed character has been read. In one such arrangement described in a paper entitled "Automatic Input for Business Data Processing Systems" by Eldredge et al., published in the Proceedings of the Eastern Joint Computer Conference, December 1956, the filter networks are in point of fact correlation networks which effect a comparison or correlation between a waveform being generated at the read station and the ideal waveforms for every possible characteristic waveform which may be generated.

Since the normal language of data processing systems is that of binary coded signals, the analog signals must be converted into binary coded signal form. The high speed operation of such character recognition devices makes it desirable that the "read-in" of information to be stored and subsequently transmitted in binary form should automatically destroy the binary information which was stored at the last "read-in."

Since this automatic destruction of previously stored information eliminates the necessity of going through a reset operation for the storage elements, there is a saving of time. Time, of course, is at a premium in a high speed operation so that any saving of the same is highly desirable. In order to make such a high speed operation feasible, high speed bistable devices are requisite for use as the encoding or storage elements.

A further consideration in such a character recognition system is the handling of noise. Spurious signals spawned within the system very often cause incorrect readings. For instance, if there is more than one signal transmitted to the logic circuitry whereat a decision is made as to what characteristic waveform signal is being transmitted, the system may select (incorrectly) the noise signal as being representative of the printed character being read. With such a possibility being present it is desirable to recognize a simultaneous reading of two signals (at least one of which is spurious), and consider such a reading as a rejection (thus providing an opportunity for a subsequent physical rejection of the document).

It follows that in a data processing system and, in particular, a system employing character recognition as described above, an encoding circuit employing high speed bistable devices which provides simultaneously "read-in" and prior information removal, and which provides a reject signal if two or more signals are passed simultaneously to the encoder, is desirable.

It is therefore an object of the present invention to provide an improved encoding circuit.

It is a further object of the present invention to provide an encoding circuit which will automatically simultaneously encode a signal appearing on any one of a plurality of channels while destroying the information previously stored or encoded.

It is another object of the present invention to provide a reject pulse if more than one channel simultaneously attempts to pass a signal to the encoding elements.

In accordance with a main feature of the present invention, there is provided a plurality of bistable devices coupled in parallel by means of a plurality of parallel circuits respectively to a plurality of channels, so that a signal appearing on any channel will be transmitted to each of the bistable devices, thereby transferring the respective bistable devices into states of conduction which, when considered together, represent the binary coded form of the value of the signal which caused the bistable devices to be in such states of conduction.

In accordance with another main feature of the present invention there is provided "AND" gate circuitry means for each of the bistable devices employed so that if there is an attempt, by two or more signals, to transfer any one of the bistable devices simultaneously into its two steady states, the "AND" gate will provide an output signal which will serve as a reject signal.

Figure 1:
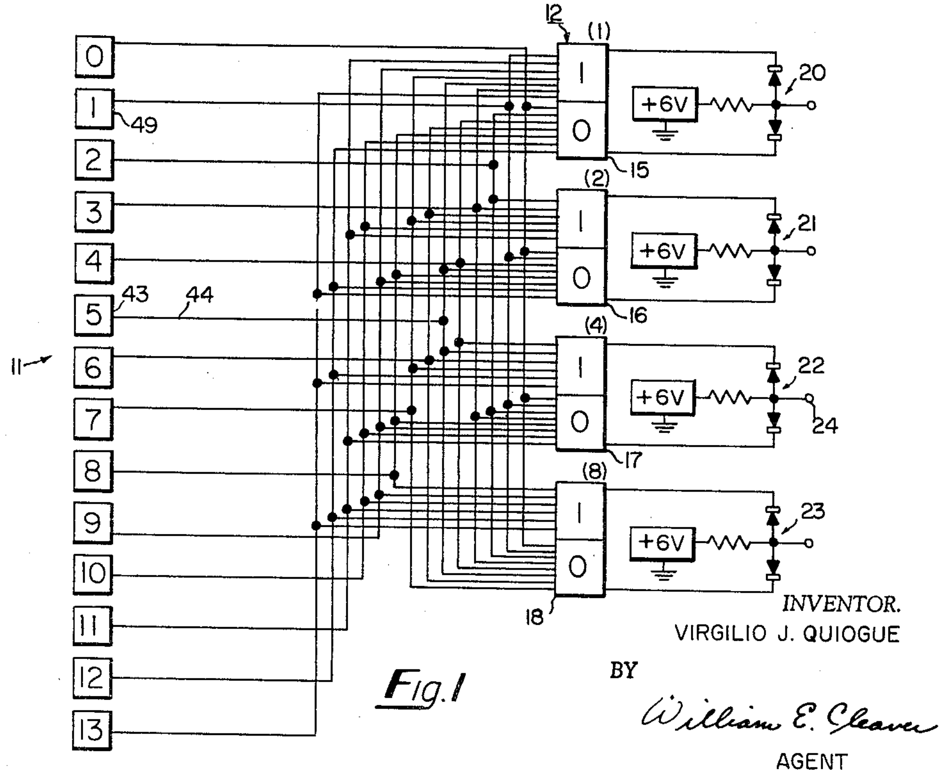

The foregoing and other objects and features of this invention will be best understood by reference to the following description of an embodiment of the invention taken in conjunction with the accompanying drawings, wherein FIG. 1 is a schematic and block diagram showing the bistable devices coupled to the channels to provide an encoding bank;

FIG. 2 is a schematic of the high speed bistable device including the "AND" gate reject circuitry.

The character recognition system with which the preferred embodiment of the present invention has been employed provides a reading station to translate a printed character into a characteristic electrical waveform. Each waveform signal which is thus generated is passed to a plurality of correlation networks. There is a correlation network assigned to each possible printed character which may be read at the read station. Each correlation network is designed to represent the ideal waveform signal which would be generated by its assigned printed character. These networks perform a correlation between every waveform signal generated at the read station and the ideal waveform of each of the possible characters to be read. The "best" correlation occurs between the waveform signal of the character actually being read and the ideal waveform network assigned to this character. Although for any comparison operation each network produces a signal, ideally the circuit by further refinement should produce only one signifiacnt signal at the final transmission channel, that being the signal from the network representing the actual character being read at the read station. The waveform signals which occur are analog signals and are preferably converted into binary form for further use in the character recognition device, which is a form of data processing system.

Considering the role of the present invention, it is to be assumed in FIG. 1 that the channels 11 transmit the output signals from the correlation networks. Athough the preferred embodiment of the present invention is described in connection with the character recognition system, it is to be clearly understood that the invention can operate in any system wherein there are multiple channels, each of which might have a signal thereon whose assigned value needs to be encoded in binary form.

In FIG. 1 each of the channels 11 is assigned a value, "0" through "13," as depicted in the blocks. These values have corresponding binary coded values. In FIG. 1 the flip-flops or bistable devices 12 are weighted according to the binary number arrangement 1–2–4–8. The weighted numbers are shown in parentheses alongside each bistable device. A different binary code, such as the Gray code, could easily be substituted. The binary number weighted code is used in this description for purposes, of illustration.

Consider that the printed numeral character five has passed through the reading station and that the correlation networks in conjunction with the refinement circuits have functioned properly to provide one signal only, that signal being on channel 43 which has been assigned to the printed character five. The signal provided on channel 43 will pass along the lead 44 to the connected parallel circuitry and thus pass to each of the bistable devices 12. If the parallel leads connected to the lead 44 in FIG. 1 are traced out, it will be revealed that in response to the signal on lead 44 the flip-flop 15 is placed in the "1" state, the flip-flop 16 in the "0" state, the flip-flop 17 in the "1" state, and the flip-flop 18 in the "0" state. When considered together, the flip-flops 12 will read from top to bottom 1–0–1–0, which reading in accordance with the weighted values equals the number 5.

It will be seen that any of the channels 11 might pass a signal to the bistable devices or flip-flops 12 to place the appropriate flip-flops in such states that when considered together the flip-flops will represent the coded value of the numerical value assigned to the active channel which set their states. This can be more fully appreciated by tracing the parallel circuitry in FIG. 1 from any of the channels 11 to the bank of flip-flops 12. It also becomes apparent that, irrespective of whatever information might be stored in the encoder bank, i.e., whatever states the flip-flops 12 might be in when a signal is transmitted from any one of the channels 11, the stored information will be wiped out and will not affect the immediate and correct storage of the information being read in. In other words, the information which at any time is stored in the flip-flops 12 is destroyed simultaneously with the setting of the flip-flops 12 in response to a signal on any channel.

Once again considering the illustration in which the printed numeral character "5" is being read in the read station, assume that either the correlation networks momentarily are not functioning properly or that from some outside source noise has been spawned in the system. Consider that the noise finds its way to channel 49 representing the numeral "1" and causes transmission of a signal at substantially the same time as there appears a signal on the channel 43. The flip-flops in bank 12 will endeavor to be placed in the appropriate states of conduction to represent both the coded numeral 1 and the coded numeral 5. One or more of the reject output circuits 20, 21, 22 and 23, which have been respectively provided with each of the flip-flops in bank 12, will recognize that their associated bistable device is being subjected to signals which are attempting to place the particular bistable device into two different steady states at the same time. In the example under consideration, only flip-flop 17 will experience this dual input. The signal from channel 43 representing the numeral 5 will attempt to place the flip-flop 17 in the "1" state, while the signal from channel 49 representing the numeral 1 will attempt to place the flip-flop 17 in the "0" state. With both sides of the flip-flop 17 being momentarily conditioned to conduct, the "AND" gate in the reject output circuit 22 will be conditioned to provide an output signal at terminal 24, as will be more fully explained hereinafter in connection with FIG. 2. The signal which appears at the terminal 24 may be utilized in any number of ways as a reject signal to indicate that there has been an unsatisfactory reading of the character in the read station at this particular time.

The operation of the flip-flop employed in the bank 12 of the preferred embodiment can be better understood by considering the following more detailed explanation of FIG. 2.

In FIG. 2 there is shown a flip-flop comprising four transistors 25, 26, 27 and 28, each in the grounded-emitter connection. Although in the preferred embodiment transistor flip-flops are suggested, it is to be understood that other types of bistable devices such as tube circuits, magnetic circuits, etc., may well be used, provided the necessary circuitry to accomplish their particular flip-flop operations is also included. It is to be further understood that while in FIG. 2 there are shown for purposes of illustration representative component values and particular value voltage reference levels, these component values and these voltage reference levels may be different to accommodate the design requisite of a particular system, so long as the basic operation of the bistable device, including the reject output circuitry, is accomplished in a similar manner.

For the operation of the specific circuit of FIG. 2, there are applied to the base elements of the transistors 25 and 28 respectively, signals from a plurality of "one" inputs 29, and signals from a plurality of "zero" inputs 30. The "one" inputs 29, and the "zero" inputs 30, represent the connections from the channels 11 shown in FIG. 1 which are connected to the "one" and "zero" sides of a flip-flop of bank 12. It will be noted that there are provided eight inputs at each 29 and 30 to correspond to the largest number of inputs shown in FIG. 1. Depending on how large the bank of flip-flops 12 might be, more inputs could be added.

Consider first the operation of the high speed flip-flop shown in FIG. 2 when there is a normal transfer from the "0" side to the "1" side. The transistors 26 and 27 are the stable state transistors of the flip-flop. Transistor 26 is conducting when the flip-flop is considered to be in the "1" state, and transistor 27 is conducting when the flip-flop is considered to be in the "0" state. Since the detailed description of the flip-flop operation being reviewed at this point deals with switching from the "0" state to the "1" state, the PNP transistor 27 will be considered conducting. Such conduction causes the point 31 to be approximately minus 0.1 volt with respect to ground. This potential appears at the base (through a base input resistor) of the PNP transistor 26 and is insufficient to bias transistor 26 into conduction. Hence, transistor 26 is "OFF." The input channels 29 and 30 are initially considered as having no signals thereon, so that the base element 32 of the transistor 28, and the base element 25*a* of transistor 25, are each held at a positive potential close to ground, and therefore these transistors are non-conducting.

When the flip-flop is to be transferred to the "1" state, a negative signal appears on one of the "one" inputs 29 and therefore appears at the base 25*a* of transistor 25. Transistor 25 conducts and the potential of its collector, point 37, rises almost to ground potential. The potential of point 33 also rises, and since point 33 is connected to the base of transistor 27, this rise in potential tends to render transistor 27 non-conducting. This, in turn, causes point 31 to become more negative, which in turn causes transistor 26 to conduct more vigorously, which further in turn drives point 33 less negative, etc. This regenerative action effects a transfer of the flip-flop to the "1" state.

When transistor 26 is conducting (indicating that the flip-flop is in the "1" state) there is a potential of approximately minus 0.1 volt relative to ground provided at point 34 which tends to cause the transistor 35 to conduct at a relatively slow rate compared to its vigorous conduction when the flip-flop was in the "0" state and transistor 27 was conducting at which time there was applied at point 34 a potential of approximately minus 7 volts. Although neither of the output transistors 35 or 35*a* is rendered cut off, the voltage value at the output terminal, for instance terminal 36, will be either higher or lower depending upon the degree to which the associated transistor, in this case transistor 35, is conducting, and as just pointed out above, the degree of conduction of transistor 35 (and 35*a*) will depend upon the state of the flip-flop.

If, at the time there is to be a transfer of the flip-flop from one stable state to the other, there are signals received substantially simultaneously at one of the inputs 29 and one of the inputs 30, both the transistors 25 and 28 will be rendered conducting. With transistors 25 and 28 each in a conducting state, the points 37 and 38 will move in a positive direction from their previous negative voltage values, that is, these points will approach ground, becoming approximately minus 0.1 volt. These potentials at points 37 and 38 will not completely back bias the diodes 39 and 40 but will cause a greatly reduced current to flow through the resistor 41*a* and consequently developing a much smaller voltage drop thereacross, so as to provide a more positive output signal at terminal 41 (approximately zero volts). In a manner similar to that described in connection with the defined outputs at the terminals 36 and 36*a*, it is to be understood that for the particular operation of the circuit of FIG. 2 the relatively positive voltage value at point 41 of approximately zero volts represents a reject signal, while the voltage value of approximately minus 8 volts present at point 41 when at least one of the transistors 25, 28 is not conducting represents a non-reject output signal. The output signal at 41 is the reject output signal which is utilized in the data processing system to indicate that there has been an unsatisfactory reading of a particular character as described hereinbefore.

While I have described above the principles of my invention in connection with specific apparatus, it is to be clearly understood that this description is made only by way of example and not as a limitation to the scope of my invention as set forth in the objects thereof and in the accompanying claims.

What I claim is:

1. A bistable device comprising: first and second controllable switching electron transfer devices, first and second controllable stable state electron transfer devices respectively associated with said first and second switching electron transfer devices, each of said controllable electron transfer devices having an input, output and control element, first, second and third voltage reference sources, first circuitry means coupling in common the output elements of said second electron transfer devices to the control element of said first stable state electron transfer device and between said first and second voltage reference sources, second circuitry means coupling in common the output elements of said first electron transfer devices to the control element of said second stable state electron transfer device and between said first and second voltage reference sources, a group of first state input channels connected to a first common output means and a group of second state input channels, connected to a second common output means, said first and second common output means coupled respectively to the control elements of said first and second controllable switching electron transfer devices to respectively produce conduction therethrough when a first or second state signal is provided on its proper channel, each of said switching electron transfer devices, when conducting, rendering non-conducting the stable state electron transfer device not associated therewith which in turn renders conducting the stable state electron transfer device associated with the conducting switching device, third circuitry means coupling said input elements of each of said electron transfer devices to said third reference potential source, first state and second state output means respectively coupled to said first and second stable state electron transfer devices to be respectively responsive to conduction therethrough, and coincident circuitry means coupled to said output elements of said switching electron transfer devices to provide an alarm signal if said first and second switching electron transfer devices are caused to conduct substantially simultaneously.

2. A bistable device according to claim 1 wherein said electron transfer device include transistor devices.

3. A bistable device according to claim 1 wherein said first and second circuitry means respectively include a loop circuit comprising, first and second resistors with a shunted connected diode coupled to said first voltage reference source, a third resistor and fourth resistor series connected between said loop circuit and said second voltage reference source and means connecting said associated control elements between said series connected third and fourth resistors.

4. A bistable device comprising: first and second switching transistors, first and second stable state transistors respectively associated with said first and second switching transistors, each of said transistors having a base, emitter and collector element, first, second and third voltage reference sources, first circuitry means coupling in parallel the collectors of said second switching and stable state transistors to the base of said first stable state transistor and between said first and second voltage reference source, second circuitry means coupling in parallel the collectors of said first switching and stable state transistors to the base of said second state transistor and between said first and second voltage reference source, a plurality of first and second stage input channels coupled respectively in parallel to the base elements of said first and second switching transistors to respectively provide conduction therethrough when a first or second state signal is provided on its proper channel, each of said switching transistors, when conducting, rendering non-conducting the stable state transistor not associated therewith which in turn renders conducting the stable state transistor associated with the conducting switching transistor, third circuitry means coupling said base elements of each of said transistors to said third reference potential source, and first state and second state output means respectively coupled to said first and second stable state transistors to be respectively responsive to conduction therethrough, and an "AND" gate circuitry means having two inputs coupled to said collector elements of said switching transistors to provide an alarm signal if said first and second switching transistors are caused to conduct substantially simultaneously.

5. In a multiple channel electrical circuit arrangement wherein each channel is assigned to represent a different data value, an encoder device for translating an electrical signal appearing on any particular channel into a coded form representing the assigned data value of the particular channel while simultaneously removing any prior coded presentation comprising a plurality of bistable devices each including a first and a second stable state transistor having cross coupling means from an output electrode of each to a control electrode of the other, each bistable device also including a first and a second switching transistor for controlling respective inputs to said first and second stable state transistors, and input circuit means coupling one or the other but not both of said switching transistors of each of said bistable devices to each of said channels in unique combinations representing the assigned data values of the said particular channels to render in response to a signal on a particular channel each of said bistable devices into the proper stable state so that in combination said bistable devices represent the coded value of the channel whose signal rendered them in said stable state combination, and so that receipt of substantially simultaneous electrical signals on any combination of two of said channels provides substantially simultaneous signals to switching transistors controlling both stable state transistors of at least one said bistable device.

6. The combination of claim 5 and additionally including alarm circuitry individual to each of said bistable devices for detecting simultaneous conduction of said switching transistors of any of said bistable devices.

7. The combination of claim 6 wherein said alarm circuitry of each of said bistable devices includes a pair of back-to-back diodes connected between said first and second switching transistors and a voltage source and a terminal connected between said diodes.

8. A random encoder device for translating data values into binary form wherein each of a plurality of input channels to said device represents a specific data value comprising a plurality of bistable devices each representing by its individual stable states the presence and absence of a predetermined weighted binary value and each of said bistable devices having individual input connections controlling each of its stable states, and a control circuit individual to each of said input channels, each said control circuit interconnecting its associated input channel with a said input connection for one and only one of the stable states of each of said bistable devices in a unique biniary combination for each of said specific data values, whereby receipt of substantially simultaneous input signals on any combination of two of said channels provides substantially simultaneous signals to said inputs controlling both stable states of at least one bistable device.

9. The combination of claim 8 wherein electrical signals are normally received individually and consecutively in the encoder device, said bistable devices store the binary value of any said signal until the next signal is received, and the receipt of said next signal automatically destroys the said stored signal.

10. The combination of claim 9 including in addition circuitry means individual to each of said bistable devices for detecting said substantially simultaneous signals received at said inputs controlling both stable states of said at least one bistable device.

11. The combination of claim 10 wherein said circuitry means includes AND gate means.

References Cited in the file of this patent

UNITED STATES PATENTS

| | | |
|---|---|---|
| 2,731,631 | Spaulding | Jan. 17, 1956 |
| 2,845,617 | Turvey | July 29, 1958 |
| 2,907,019 | Merlin | Sept. 29, 1959 |
| 2,907,899 | Kabell et al. | Oct. 6, 1959 |
| 2,948,820 | Bothwell | Aug. 9, 1960 |
| 2,949,549 | Hoge | Aug. 16, 1960 |
| 2,994,076 | Havens | July 25, 1961 |
| 3,004,252 | Zola et al. | Oct. 10, 1961 |
| 3,021,065 | Reynolds | Feb. 13, 1962 |

UNITED STATES PATENT OFFICE

CERTIFICATE OF CORRECTION

Patent No. 3,153,781 October 20, 1964

Virgilio J. Quiogue

It is hereby certified that error appears in the above numbered patent requiring correction and that the said Letters Patent should read as corrected below.

Column 6, line 23, after "second" insert -- stable --; line 25, for "stage" read -- state --.

Signed and sealed this 13th day of April 1965.

(SEAL)
Attest:

ERNEST W. SWIDER
Attesting Officer

EDWARD J. BRENNER
Commissioner of Patents